W. E. ATON.
AGRICULTURAL IMPLEMENT.
APPLICATION FILED NOV. 15, 1920.

1,419,602.

Patented June 13, 1922.
2 SHEETS—SHEET 1.

Inventor
W. E. Aton

By Lacey & Lacey, Attorneys

W. E. ATON.
AGRICULTURAL IMPLEMENT.
APPLICATION FILED NOV. 15, 1920.
1,419,602.
Patented June 13, 1922.
2 SHEETS—SHEET 2.
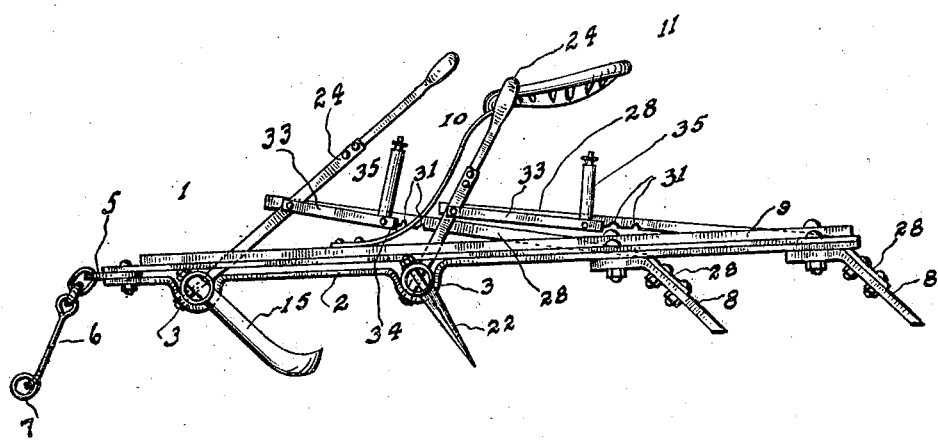
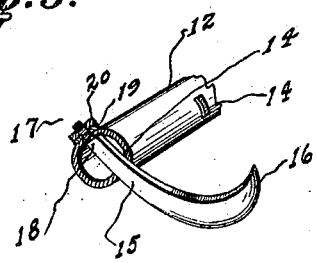
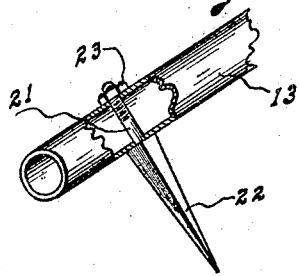
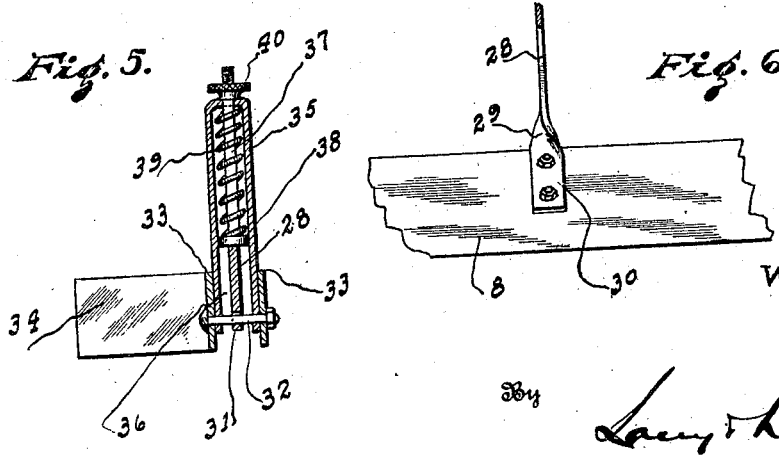
Inventor
W. E. Aton
By Lacey & Lacey, Attorneys

UNITED STATES PATENT OFFICE.

WILLIAM E. ATON, OF MILBURN, KENTUCKY, ASSIGNOR TO MILBURN IMPLEMENT MANUFACTURING CO., OF ARLINGTON, KENTUCKY.

AGRICULTURAL IMPLEMENT.

1,419,602.  Specification of Letters Patent.  Patented June 13, 1922.

Application filed November 15, 1920. Serial No. 424,250.

*To all whom it may concern:*

Be it known that I, WILLIAM E. ATON, a citizen of the United States, residing at Milburn, in the county of Carlisle and State of Kentucky, have invented certain new and useful Improvements in Agricultural Implements, of which the following is a specification.

This invention has for its object the provision of an agricultural implement by the use of which a seed bed will be completely prepared at a single operation. The invention has for its object the provision of novel means for holding the ground-breaking elements in a set position and also the provision of an implement which will be cheap and durable and efficient in operation.

The invention is illustrated in the accompanying drawings, in which—

Fig. 2 is a side elevation of the same;

Fig. 3 is a detail view showing the manner of securing one of the ground-breaking elements;

Fig. 4 is a similar view showing the means for securing another of said elements;

Fig. 5 is an enlarged detail section of a portion of the means for holding the ground-breaking elements in a set position;

Fig. 6 is a detail rear elevation showing the manner of securing the floating locking bar in place.

Figure 1:
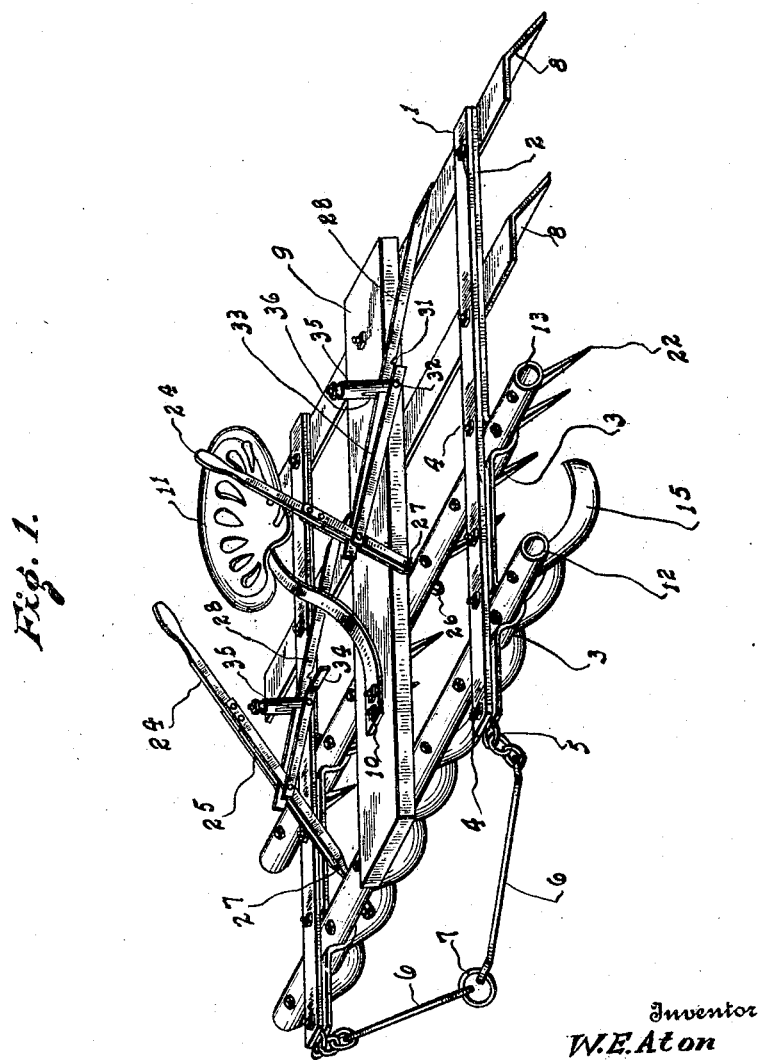
Figure 1 is a perspective view of an implement embodying my present improvements.

In carrying out my present invention, I employ frame bars each consisting of an upper metallic strap or bar 1 and a lower bar 2 of similar length and width but provided in its forward portion with down-turned cups or depressions 3 forming bearings for the harrow bars, as will be presently set forth. These bars 1 and 2 are secured together at intervals by bolts, as shown at 4, and the bolt at the front ends of the bars serves also as means for attaching a draft link or eye 5 receiving one end of a draft rod 6, the draft rods at the two sides of the implement converging forwardly and inwardly to be engaged in a coupling ring 7 to which the draft-applying devices may be attached. The implement may be drawn over the ground by draft animals or by a tractor, as will be readily understood.

The rear portions of the frame bars are secured rigidly to drags 8 which may be of any desired form and in the drawings are shown as consisting of angle bars having their upper webs disposed horizontally to receive the securing bolts by which they are attached to the frame bars and having their depending webs arranged to run upon the ground so that the pulverized soil will be spread evenly and clods which may have escaped the harrow teeth or the other breaking members will be broken up and crushed and a bed produced ready for planting. The particular form of these drags is not essential as the desired result may be obtained with drag bars of various shapes and it may be sometimes convenient to employ heavy wooden beams secured to the frame bars and provided with straight lower edges adapted to run upon the surface of the ground. I also rigidly secure to the drags, at the centers thereof, a longitudinally disposed beam or platform 9 upon which is secured a seat standard 10 carrying a seat 11 at its upper end.

Harrow bars 12 and 13 are rotatably mounted in the cups or bearings 3 and these harrow bars may conveniently be metal tubes or pipes. The forward bar 12 is provided with a series of circumferential slots 14 in its rear wall which receive the ends of the angular shanks 15 of blades 16 which, as clearly shown in Figs. 1 and 2, are supported in an inclined position by the harrow bar so as to run upon the surface of the ground and cut into the surface soil and turn the same to one side, the blades 16 being slightly deflected at their extremities. Each shank 15 terminates in a reduced externally threaded stem 17 whereby a shoulder 18 is formed at the base of the stem. As shown in Figs. 2 and 3, the several shanks extend into the harrow bar with the shoulder 18 abutting the forward wall of the bar and the threaded stem extending through said wall. A washer 19 and a nut 20 are mounted upon the stem 17 and turned home against the harrow bar so as to firmly secure the blade in place. In the form of the invention illustrated, there are two harrow bars and two drag bars and the second harrow bar 13 is provided with diametrically opposite openings through its walls to receive a threaded stem 21 extending from a straight harrow tooth 22 and equipped with a nut 23 adapted to be turned home against the harrow bar whereby to draw the tooth 22 firmly against the bar and clamp the tooth in place as will be readily understood upon reference to Fig. 4. The teeth 22 and the blades 16 may be disposed in alinement longitudinally of the implement or may be staggered relative to each other as may be desired, but with either arrangement as the implement is drawn over the field the surface soil will be cut up and turned aside by the blades and will be then immediately acted upon by the harrow teeth so as to be further pulverized and formed into a fine mulch, after which the drags will pass over the soil and will spread the same evenly and break up any clods which may have escaped the blades and the teeth.

Various conditions and characteristics of different soils require different adjustments of the blades and the harrow teeth in order to obtain the necessary penetration and pulverization of the soil. To accomplish this adjustment, the harrow bars 12 and 13 are rotatable in their supports 3 and each bar has a hand lever 24 secured rigidly therein and extending radially therefrom. As shown, the hand lever is preferably provided in its lower portion with a longitudinal slot 25 and has its lower extremity inserted diametrically through the respective harrow bar and secured therein by a nut 26 turned home against the bar, an abutment 27 being formed on the lever immediately above the bar, as shown, so as to obtain the desired clamping action. The levers are, of course, so disposed and of such length that they may be conveniently manipulated by an operator upon the seat 11 and the longitudinal slot of each lever receives the forward end of a floating locking bar 28. The locking bar may conveniently be a flat metallic bar having its rear extremity twisted, as shown at 29, whereby it will present a flat end 30 to the drag 8 to which it is fixed, one bar being secured to each drag and extending upwardly and forwardly therefrom so as to project through the longitudinal slot of the lever cooperating therewith. In the under edge of each bar 28, I provide a series of notches 31 which may be engaged by a latch pin 32 at the rear end of links 33 which are pivoted at their front ends to the respectively adjacent lever 24, as shown. A pair of links 33 is provided to cooperate with each locking bar and the link at the inner side of the bar is provided at its rear end with a lateral extension 34 forming a treadle by which the link may be depressed by the foot of the driver to release the pin or bolt 32 from the notch 28 in which it is engaged. To hold the pin or bolt 32 in engagement with a notch 28, I provide a tubular casing or sleeve 35 which is slotted at its lower end to fit over the respectively adjacent locking bar 28, as shown at 36, and within the said casing or sleeve is arranged a plunger 37 having a head 38 at its lower end bearing upon the upper edge of the locking bar and held thereto by a spring 39 coiled around the plunger stem and bearing upon the head 38 and against the closed top of the casing, as will be readily understood upon reference to Fig. 5, the spring tending constantly to expand and thereby raise the casing so that the pin or bolt 32 passing through the lower end of the same will be drawn into the adjacent notch 31. A nut 40 is fitted upon the upper end of the plunger stem and bears upon the top of the casing so that the tension of the spring 39 may be readily adjusted. It will be readily understood that the pin or bolt 32 which constitutes a pivotal connection between the casing 35 and the links 33 will by its engagement with a notch 31 prevent longitudinal movement of the links relative to the floating locking bar 28 and will, therefore, hold the lever 24 and the harrow bar in the position in which they may be set. When it is desired to vary the inclination of the harrow blades or teeth, the proper hand lever is swung forwardly or backwardly and the corresponding harrow bar 12 or 13, as the case may be, will be rotated about its own longitudinal axis thereby raising or lowering the blades or the teeth, as will be readily understood. To permit the hand lever to be swung forwardly or backwardly, the operator depresses the pedal 34 so that the pin or bolt 32 will be released from the notch 31 in which it is engaged and the lever is then swung while the pressure upon the pedal is maintained, the plunger riding along the upper edge of the locking bar until the desired adjustment has been reached whereupon the pedal is released and the spring 39 at once draws the pin 32 into engagement with the adjacent notch 31.

My device is exceedingly simple in its construction and is very compact in its arrangement. All the parts are readily accessible so that repairs may be easily effected when necessary, but owing to the simplicity of its construction and arrangement repairs will be seldom needed under normal conditions. The adjustment of the ground-engaging members may be effected quickly and easily and the parts of the implement may be readily assembled in operative relation so that it is not necessary to ship the implement in completed or set up form.

It will, of course, be understood that two or more drag bars may be employed and that the number of harrow bars may be also varied as circumstances may dictate.

Having thus described the invention, what is claimed as new is:

1. In an agricultural implement, the combination of a frame, a bar rotatably mounted on the frame, a floating locking bar secured rigidly at its rear end to the frame in rear of the rotatably mounted bar and projecting forwardly above the said bar, the front end of the locking bar being free, a lever secured rigidly to the rotatably mounted bar and projecting upwardly past the locking bar, a latch movable longitudinally upon the locking bar and adapted to engage the same, and connections between the said latch and the lever.

2. In an agricultural implement, the combination of a frame, a rigid floating locking bar provided with notches in its lower edge, a bar rotatably supported upon the frame, a hand lever secured rigidly to the rotatably mounted bar rising therefrom past the free end of the locking bar, a link pivoted to and extending from the lever alongside the locking bar, a pin carried by the rear end of the link to engage one of the notches in the locking bar, a casing rising from said pin to a point above the locking bar, and means carried by said casing to normally draw said pin into engagement with a notch in the locking bar, the link being operable to release the pin from the locking bar.

3. In an agricultural implement, the combination of a frame, a locking bar secured rigidly at one end to the frame and provided with notches in its lower edge, the opposite end of said bar being free, a bar rotatably mounted upon the frame, a hand lever secured rigidly to and rising from the rotatably mounted bar past the locking bar, a link pivoted to and extending rearwardly from the lever longitudinally of the locking bar and having a pedal at its rear end, a casing spanning the locking bar, a pin pivotally connecting said casing to the link and adapted to engage one of the notches in the locking bar, a plunger within said casing riding on the locking bar, and a spring coiled about said plunger within the casing between the plunger and the upper end of the casing and holding the pin normally in engagement with one of the notches in the locking bar.

In testimony whereof I affix my signature.

WILLIAM E. ATON. [L. S.]